(12) United States Patent
Huffman

(10) Patent No.: US 6,348,262 B1
(45) Date of Patent: Feb. 19, 2002

(54) SELF ADHESIVE TAPE AND METHOD OF FABRICATING SAME

(75) Inventor: Willard Huffman, Stoney Point, NC (US)

(73) Assignee: Plastic Packaging Inc., Hickory, NC (US)

( * ) Notice: Subject to any disclaimer, the term of this patent is extended or adjusted under 35 U.S.C. 154(b) by 0 days.

(21) Appl. No.: 09/404,186

(22) Filed: Sep. 24, 1999

(51) Int. Cl.$^7$ ................................................ C09J 7/02
(52) U.S. Cl. ...................... 428/354; 428/343; 428/353; 428/906; 442/149; 442/151; 427/208.4; 427/208.8
(58) Field of Search ................................. 428/354, 343, 428/353, 906; 442/149, 151; 427/208.4, 208.8

(56) References Cited

U.S. PATENT DOCUMENTS

| | | |
|---|---|---|
| 3,159,930 A | 12/1964 | Allen et al. |
| 3,758,970 A | 9/1973 | Annenberg |
| 3,874,893 A | 4/1975 | Cherrin |
| 4,421,817 A | 12/1983 | Pina et al. |
| 4,985,302 A | 1/1991 | Sala et al. |
| 5,162,150 A | 11/1992 | Buis et al. |
| 5,294,470 A | 3/1994 | Ewan |
| 5,346,738 A | 9/1994 | Samonides |
| 5,354,588 A * | 10/1994 | Mitchell et al. .............. 428/40 |
| 5,547,738 A * | 8/1996 | Mitchell et al. ............ 428/195 |
| 5,633,058 A | 5/1997 | Hoffer et al. |

* cited by examiner

Primary Examiner—Daniel Zirker
(74) Attorney, Agent, or Firm—Alston & Bird LLP

(57) ABSTRACT

A self adhesive tape which includes a substrate composed of a clear plastic sheet, reverse printed indicia on one side of the sheet, a flood coating of black or other colored ink overlying the printed indicia, and an adhesive coating with a mesh fabric reinforcement overlying the flood coating. The bottom surface of the sheet is not treated or coated, which permits its original gloss and sheen to be preserved, and so that the reverse printed indicia is visible therethrough as a positive image.

15 Claims, 1 Drawing Sheet

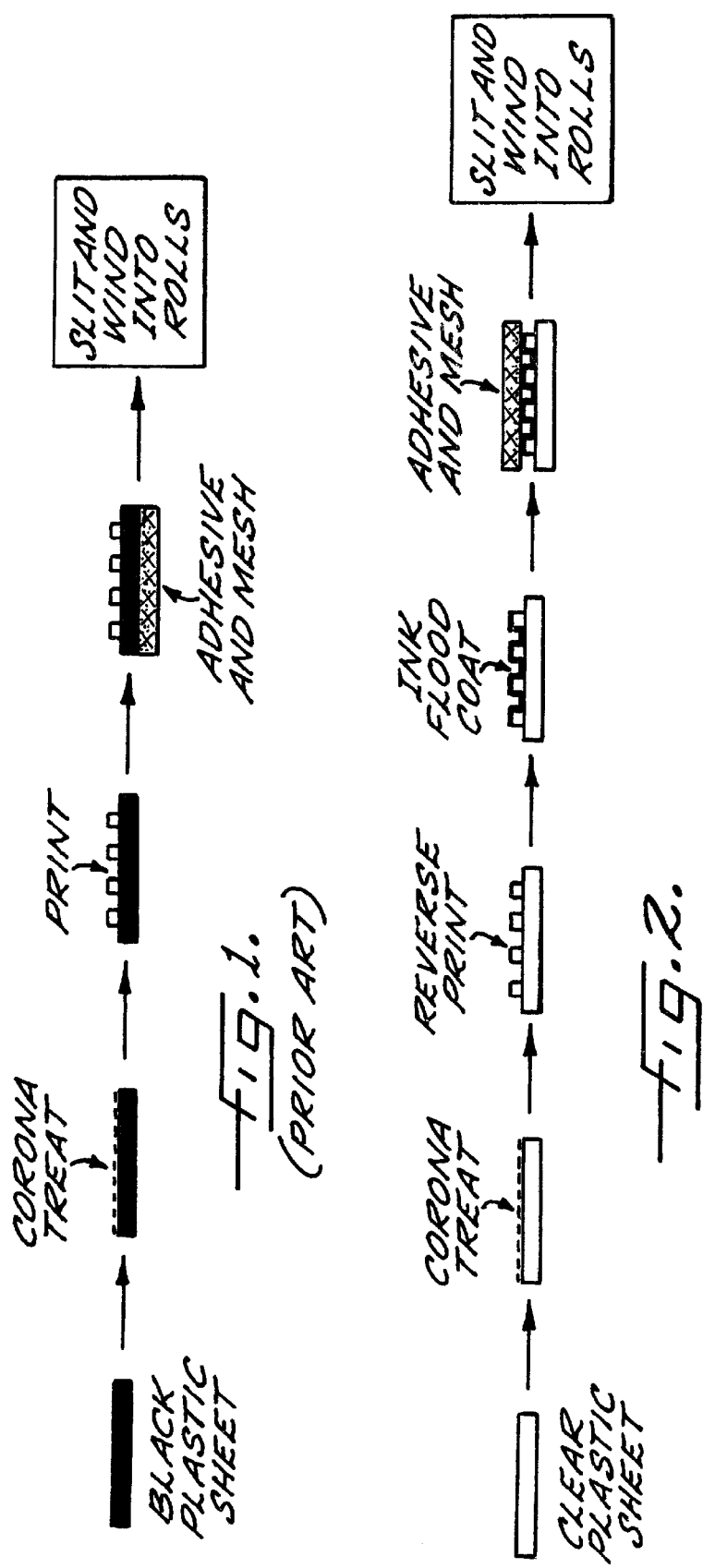

SELF ADHESIVE TAPE AND METHOD OF FABRICATING SAME

BACKGROUND OF THE INVENTION

The present invention relates to a self adhesive tape of the type commonly referred to as duct tape, and a method of fabricating same.

Duct tape is conventionally fabricated by a process as illustrated in FIG. 1, and wherein a sheet of black or otherwise colored plastic film is printed on one side with product information, or other indicia. In order to facilitate the adherence of the printing to the surface of the sheet, the surface which receives the printing may be initially corona or otherwise treated to provide a roughened "high energy" surface. After printing, the opposite side of the sheet is coated with an adhesive, which may include an embedded mesh fabric reinforcement. Also, in some instances, the back side of the sheet may also be "bump treated" as known in the art to improve the adherence of the adhesive coating. Finally, the sheet is slit and wound into rolls, with the print on the outside of the winds and the adhesive on the inside of the winds.

While duct tape as constructed above is in widespread use, difficulties have been encountered in permanently adhering the adhesive coating to the back side of the sheet, and delamination often occurs when the roll is unwound, particularly when the roll has been subjected to relatively high heat. Also, with the adhesive coating directly engaging the printing on the adjacent wind of the role, the printing can be disfigured during the unwinding operation.

It is an object of the present invention to provide an improved self adhesive tape of the type described above, and which avoids or at least significantly alleviates the above noted problems.

SUMMARY OF THE INVENTION

The above and other objects and advantages of the present invention are achieved by the provision of a self adhesive tape which comprises a substrate formed of a clear plastic sheet, and which has reverse printing applied to one side only of the sheet so that the reverse printing is visible as a positive image when viewed through the other side of the sheet. A flood coating of ink is applied to the printed side of the sheet so as to substantially cover the reverse printing, and a coating of an adhesive is applied so as to substantially cover the flood coating. The side of the sheet which receives the printing may be initially treated so as to roughen or "energize" its surface and thereby promote the adherence of the printing and the flood coating thereto. As final steps, the sheet may be slit to form a plurality of separate tapes, which are each then wound upon itself to form a roll, with the adhesive coating directly contacting the untreated back side of the sheet. Also, the rolls are preferably wound so that the clear sheet is on the outside of the winds, with the printing and adhesive on the inside of the winds.

BRIEF DESCRIPTION OF THE DRAWINGS

Other features and advantages of the present invention will become apparent as the description proceeds, when considered in conjunction with the accompanying schematic drawings, in which FIG. 1 is a flow diagram illustrating a prior art method of fabricating duct tape, and FIG. 2 is a flow diagram illustrating the product and method of the present invention.

DETAILED DESCRIPTION OF THE PREFERRED EMBODIMENTS

As illustrated in FIG. 2, the method of fabricating the tape of the present invention starts with a backing sheet of clear plastic film, such as polyethylene sheeting having a thickness of about 2–3 mils, and which forms the substrate for the resulting tape. The backing sheet is treated on one side (the upper side as illustrated) by a conventional chemical or corona treatment process which serves to roughen or scratch the surface, and the treated side is then printed by a reverse printing operation, so that the reverse printing is visible as a positive image when viewed through the other (i.e., bottom) surface of the sheet. As is conventionally recognized, the scratched or roughened surface, commonly referred to as an "energized" surface in the art, provides more surface area for an improved adherence of the printing ink and later applied other components.

The side of the sheet which has been reverse printed is then flood coated with a colored ink, so as to form a contrasting background when the printing is viewed through the other side of the clear sheet. When the flood coating has dried, a primer may be applied to the flood coating to enhance the adherence of the later applied adhesive. The primer may comprise a rubber based water emulsion, such as Hercules Res A-2603 or BASF Butofan® NS 166.

An adhesive and mesh (scrim) backing is applied over the flood coating. The adhesive coating is formulated to provide a low affinity for the untreated bottom side of the sheet when wound into a roll, as further explained below. Also, after the application of the adhesive and the mesh backing, the sheet may be run through a pair of nip rolls, which forces the adhesive through the open structure of the mesh backing. As a specific example, the adhesive may comprise the following formulation:

| | |
|---|---|
| natural or synthetic rubber | 33% |
| hydrocarbon resin | 33% |
| calcium | 31% |
| naphtha oils | 3% |

The mesh reinforcement may comprise a conventional open mesh woven fabric or scrim.

Finally, the sheet is slit and wound into rolls, with the adhesive coating directly engaging the untreated bottom surface of the sheet, and with the clear plastic sheet on the outside of the winds.

The above process and formulation of the adhesive and primer permits the adhesive to bond strongly to the flood coating of ink and thus the top surface of the sheet, and bond less strongly to the untreated bottom surface of the sheet when the tape is wound into a roll. Thus the roll can be unwound with the adhesive coating readily separating from the bottom surface and with little or no delamination of the adhesive coating from the top surface.

All of the described operations can be performed by passing the backing sheet through conventional automatic treating, printing, coating, slitting, and winding equipment, so that the tape can be readily fabricated in either a continuous or a discontinuous process.

Since the above process eliminates the need to chemically or corona treat, or coat, the bottom surface of the tape, the bottom surface is able to retain its original gloss and sheen, which improves the appearance of the product. Also, since the printed indicia and ink flood coating are effectively encapsulated between the clear backing sheet and the adhesive coating, they are not subject to deterioration from abrasion against other surfaces.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A self adhesive tape comprising
   a substrate formed of a clear plastic sheet,
   reverse printing applied to one side only of the sheet so that the reverse printing is visible as a positive image when viewed through the other side of the sheet,
   a flood coating of ink applied to the one side of the sheet so as to substantially cover the one side and the reverse printing, and
   a coating of an adhesive applied so as to substantially cover the flood coating.

2. The self adhesive tape as defined in claim 1 wherein said one side of said sheet is treated so as to enhance the adherence of the reverse printing and the flood coating thereto.

3. The self adhesive tape as defined in claim 1 wherein the tape is wound upon itself to form a roll, with the adhesive coating directly contacting said other side of the sheet.

4. The self adhesive tape as defined in claim 3 wherein the roll is wound so that the clear plastic sheet is on the outside of the winds.

5. The self adhesive tape as defined in claim 4 wherein the adhesive coating is formulated to provide a low-affinity for said other side of the sheet, so as to permit the tape roll to be readily unwound.

6. The self adhesive tape as defined in claim 4 wherein the adhesive coating comprises an open mesh fabric reinforcement embedded therein.

7. The self adhesive tape as defined in claim 1 wherein a primer is interposed between the ink flood coating and the adhesive coating to enhance the adherence of the adhesive coating to the ink flood coating.

8. The self adhesive tape as defined in claim 1 wherein the clear plastic sheet comprises polyethylene and has a thickness of about 2–3 mils.

9. A method of fabricating a self adhesive tape comprising the steps of
   providing a substrate of a clear plastic sheet,
   treating one side of the sheet to provide an energized surface,
   reverse printing upon the energized one side of the sheet so that the reverse printing is visible as a positive image when viewed through the other side of the sheet,
   flood coating the one side of the sheet with ink so that the ink substantially covers the one side and the reverse printing,
   applying an adhesive coating to the one side of the sheet so that the adhesive coating substantially covers the flood coating of ink, and then
   winding the sheet into a roll, with the adhesive coating adjacent said other side of the sheet.

10. The method as defined in claim 9 wherein the adhesive coating is formulated to provide a low-affinity for said other side of the sheet, so as to permit the roll to be readily unwound.

11. The method as defined in claim 9 wherein the adhesive coating comprises an open mesh fabric reinforcement embedded therein.

12. The method as defined in claim 11 comprising the further step of applying a primer to the flood coating of ink which acts to enhance the adherence of the later applied adhesive coating.

13. The method as defined in claim 12 wherein the primer comprises a rubber based water emulsion.

14. The method as defined in claim 11 comprising, after the step of applying an adhesive coating to the one side of the sheet, the further step of passing the sheet through a pair of nip rolls to force the adhesive through the open structure of the mesh fabric reinforcement.

15. The method as defined in claim 9 wherein the winding step includes having the adhesive coating directly contacting said other side of the sheet.

* * * * *